United States Patent
Akimoto et al.

(10) Patent No.: US 8,215,001 B2
(45) Date of Patent: Jul. 10, 2012

(54) METHOD FOR MANUFACTURING A STATOR FOR INNER-ROTOR TYPE ROTARY ELECTRIC MACHINES

(75) Inventors: Akito Akimoto, Kariya (JP); Masaomi Dobashi, Kariya (JP)

(73) Assignee: Denso Corporation, Kariya (JP)

( * ) Notice: Subject to any disclaimer, the term of this patent is extended or adjusted under 35 U.S.C. 154(b) by 602 days.

(21) Appl. No.: 12/427,160

(22) Filed: Apr. 21, 2009

(65) Prior Publication Data
US 2009/0260218 A1 Oct. 22, 2009

(30) Foreign Application Priority Data

Apr. 21, 2008 (JP) ................................. 2008-110782

(51) Int. Cl.
*H02K 15/06* (2006.01)
*H02K 3/12* (2006.01)

(52) U.S. Cl. ............ 29/598; 29/596; 310/208; 310/195; 310/179

(58) Field of Classification Search ..................... 29/596; 310/178–194, 201
See application file for complete search history.

(56) References Cited

U.S. PATENT DOCUMENTS

| | | | | | |
|---|---|---|---|---|---|
| 1,340,712 | A | * | 5/1920 | Hare | 242/395.1 |
| 4,351,102 | A | * | 9/1982 | Grozinger et al. | 29/596 |
| 6,140,735 | A | * | 10/2000 | Kato et al. | 310/201 |
| 6,376,961 | B2 | * | 4/2002 | Murakami et al. | 310/184 |
| 6,455,972 | B1 | * | 9/2002 | Asao et al. | 310/184 |
| 6,501,205 | B1 | * | 12/2002 | Asao et al. | 310/184 |
| 6,707,211 | B2 | * | 3/2004 | Oohashi et al. | 310/179 |
| 6,760,965 | B2 | * | 7/2004 | Asao et al. | 29/596 |
| 6,865,796 | B1 | * | 3/2005 | Oohashi et al. | 29/596 |
| 6,951,054 | B2 | * | 10/2005 | Hirota et al. | 29/596 |
| 7,337,525 | B2 | * | 3/2008 | Ueda et al. | 29/596 |
| 7,365,467 | B2 | * | 4/2008 | Bramson et al. | 310/180 |
| 7,386,931 | B2 | * | 6/2008 | Neet et al. | 29/596 |
| 7,546,672 | B2 | * | 6/2009 | Murase | 29/596 |
| 7,804,217 | B2 | * | 9/2010 | Hasegawa et al. | 310/179 |
| 7,812,498 | B2 | * | 10/2010 | Kouda | 310/201 |
| 7,856,701 | B2 | * | 12/2010 | Hirota et al. | 29/596 |
| 7,948,143 | B2 | * | 5/2011 | Nakamura | 310/201 |
| 7,952,250 | B2 | * | 5/2011 | Hasegawa et al. | 310/179 |
| 8,008,830 | B2 | * | 8/2011 | Kouda et al. | 310/201 |
| 2001/0019234 | A1 | * | 9/2001 | Murakami et al. | 310/180 |
| 2001/0047580 | A1 | * | 12/2001 | Stratico et al. | 29/596 |
| 2002/0030417 | A1 | * | 3/2002 | Asao | 310/201 |
| 2002/0092152 | A1 | * | 7/2002 | Asao et al. | 29/596 |
| 2004/0207282 | A1 | * | 10/2004 | Ueda et al. | 310/184 |
| 2006/0097606 | A1 | * | 5/2006 | Miyatake et al. | 310/270 |
| 2007/0180682 | A1 | * | 8/2007 | Ueda et al. | 29/596 |
| 2007/0271767 | A1 | * | 11/2007 | Murase | 29/596 |

(Continued)

FOREIGN PATENT DOCUMENTS

JP 2000-116078 4/2000

(Continued)

*Primary Examiner* — Derris Banks
*Assistant Examiner* — Kaying Kue
(74) *Attorney, Agent, or Firm* — Nixon & Vanderhye PC (57) ABSTRACT

A tapered cage coil is prepared, having a small-diameter top coil end 101 and a large-diameter base coil end. The tapered cage coil is axially inserted into a stator core. Then, the tapered cage coil is radially expanded to thrust slot-accommodated portions of the coil into slots of the stator core. This can eliminate the necessity of deforming the base coil end to thereby facilitate the manufacturing procedures. At the same time, possible spring back can be mitigated.

8 Claims, 10 Drawing Sheets

U.S. PATENT DOCUMENTS

| | | | |
|---|---|---|---|
| 2008/0179983 A1* | 7/2008 | Hasegawa et al. | 310/179 |
| 2009/0260219 A1* | 10/2009 | Takada et al. | 29/596 |
| 2009/0261685 A1* | 10/2009 | Akimoto et al. | 310/207 |
| 2010/0064505 A1* | 3/2010 | Takada et al. | 29/596 |
| 2010/0077599 A1* | 4/2010 | Tokizawa | 29/596 |
| 2010/0141078 A1* | 6/2010 | Kouda et al. | 310/195 |
| 2010/0187938 A1* | 7/2010 | Yamamoto et al. | 310/195 |
| 2010/0244615 A1* | 9/2010 | Kouda | 310/215 |
| 2011/0041318 A1* | 2/2011 | Akimoto et al. | 29/596 |
| 2011/0099797 A1* | 5/2011 | Mishina et al. | 29/596 |

FOREIGN PATENT DOCUMENTS

| | | |
|---|---|---|
| JP | 3894004 | 12/2006 |
| JP | 3982446 | 7/2007 |

* cited by examiner

CIRCUMFERENTIAL DIRECTION →

METHOD FOR MANUFACTURING A STATOR FOR INNER-ROTOR TYPE ROTARY ELECTRIC MACHINES

CROSS-REFERENCE TO RELATED APPLICATION

This application is based on and claims the benefit of priority from earlier Japanese Patent Application No. 2008-110782 filed Apr. 21, 2008, the description of which is incorporated herein by reference.

BACKGROUND OF THE INVENTION

1. Technical Field of the Invention

The present invention relates to a method for manufacturing a stator used, for example, for rotary electric machines, and in particular to a method for manufacturing a stator for radially-gapped inner-rotor type rotary electric machines.

2. Related Art

Recently, it is essential for the automotive industry to give serious consideration to the environment and power saving. Under such circumstances, EVs (electric vehicles) and HVs (hybrid vehicles) have been researched and put to practical use.

In vehicles, such as EVs and HVs, it is important to reduce vehicle weight that has a strong positive correlation with fuel consumption. In this regard, there has been a strong demand for enhancing output per unit weight (kW/kgw) of a high-current motor (e.g., drive motor) loaded on such a vehicle. It has been known that, in a stator incorporated in such a motor, the increase in a space factor of slots, i.e. the cross-sectional area of the coil conductor per unit cross-sectional area of slots, in the stator, has a strong positive correlation with the output per unit weight of the motor (kW/kgw).

One known method for winding a coil about a stator involves use of a coil winder. In the case of a conventional winding method, i.e. in the case of winding a fine round wire about one slot, using such a coil winder, it is necessary to ensure a space in the slot, to which the coil winder is inserted. In addition, the cross section of the coil conductor has a circular shape. For these reasons, the space factor of slots (hereinafter referred to "slot space factor") of a stator about which a coil is wound has been as small as about 40%.

It should be appreciated that, throughout the specification, when a term "cross section" or "cross-sectional area" is used for a winding or a wire, the term refers to a cross section or a cross-sectional area perpendicular to the longitudinal direction of the wire.

If a flat wire having a large cross-sectional area can be used as a stator coil, the slot space factor may be remarkably improved. However, such a large-size flat wire cannot be wound about a stator with the use of a coil winder, unlike the case of winding a normal fine round wire. On the contrary, bending, per se, has been difficult in winding such a large-size flat wire. Therefore, when a stator is manufactured using a large-size flat conductor wire, the method may preferably include a step of bending the large-size flat conductor wire for preparation of a stator coil in advance, followed by a step of inserting portions of the conductor wire of the coil to be accommodated in slots (herein after referred to as "slot-accommodated portions") into the respective slots of the stator core, for completion of a stator.

Stator coils are known to have concentrated winding or distributed winding. Comparing with the latter, the former is known to have an advantage, for example, of reducing torque ripple. A stator coil having a distributed winding of a large-size flat conductor wire will have a shape of a cage (hereinafter referred to a "cage stator coil" or a "cage coil"). The outer diameter of such a cage stator coil will be approximately equal to that of the bottom surface of the slots of the stator core. For this reason, the stator coil cannot be easily inserted into a cylindrical stator core. Specifically, a cage stator coil prepared using a large-size flat square conductor wire of large cross-sectional area will have a very large rigidity. Therefore, it will be difficult to dispose the slot-accommodated portions, as they are, so as to be located radially inside the stator core having a relatively small inner diameter.

An approach known for avoiding the difficulty mentioned above in mounting a cage stator coil in the slots of a stator core, may be to use a divided core structure. Specifically, in this approach, a stator is divided into a plurality of segment cores (also referred to as "divided cores"). Then, the slot-accommodated portions of the cage stator coil are inserted into the slots of each divided core. After that, the divided cores are mechanically connected to complete a stator. Owing to the combination of such a divided-core type stator with a cage stator coil, an insulation-coated flat conductor wire having a large cross-sectional area can be used as a coil conductor to realize a radially-gaped inner-rotor type rotary electric machine having a good slot space factor. However, use of such divided cores may raise a lot of problems, such as increase of magnetic resistance. Also, reducing the number of divisions of a core means that difficulty may be caused in the insertion of a stator coil.

In this regard, Japanese Patent No. 3982446 suggests a method for assembling a stator coil. According to the assembling method disclosed in this reference, a cage stator coil whose outer diameter is smaller than the inner diameter of a stator core is inserted into the stator core. After the insertion, the diameter of the stator coil is expanded, whereby the slot-accommodated portions are thrust into the respective open slots of the stator core. Hereinafter, this method is simply referred to as an "open-slot thrust method".

However, with the open-slot thrust method mentioned above, two coil ends at both ends of the cage stator coil are required to be biased axially inward while being radially expanded. Further, use of a large-size flat conductor wire to form coil end portions configuring the coil ends, may necessitate plastic deformation of the coil ends with an extraordinarily large force.

This means that large bending forces are concentrated on each of the coil ends, leading to a concern that damage may be caused to the insulation coating at the surface of each coil end which is brought into contact with a bending/biasing end portion of a bending device. Additionally, since the elasticity of the coil ends is large, there has also been a great concern that the coil ends that have been bent radially outward will spring back for restoration to permit the slot-accommodated portions of the stator coil to come out from the slot openings to the inside.

SUMMARY OF THE INVENTION

The present invention has been made in light of the problems mentioned above, and has as its object to provide a method for manufacturing a stator for inner-rotor type rotary electric machines, which can be manufactured easier and has excellent qualities, such as good durability.

The present invention for resolving the above problems provides a method for manufacturing a stator for an inner-rotor type rotary electric machine comprising: a stator core having an inner peripheral surface in which a number of slots are circumferentially provided at a predetermined pitch; and a tapered cage coil consisting of a distributed-winding coil having a number of slot-accommodated portions to be accommodated in the slots, the slot-accommodated portions being arranged at a predetermined circumferential pitch and positioned being radially apart from the axis by a predetermined distance, the tapered cage coil having a top coil end and a base coil end each of which is made up of a group of coil end portions, each coil end portion connecting two adjacent slot-accommodated portions to be radially projected from two adjacent slots which are distanced from each other by an electrical angle of "π", wherein the method comprises: preparing the tapered cage coil that includes the top coil end having a diameter smaller than that of the inner peripheral surface of the stator core, the base coil end having a diameter larger than that of the inner peripheral surface of the stator core, and the slot-accommodated portions which are provided being inclined from the top coil end to the base coil end so that a distance from the axis is increased toward the base coil end; starting axial insertion of the tapered cage coil into the stator core, with the top coil end being inserted first; individually inserting the slot-accommodated portions, during the axial insertion, into the slots from respective openings of the slots; stopping the axial insertion after the top coil end has projected from an end face of the stator core; and thrusting the slot-accommodated portions into the slots by axially compressing the top coil end while the slot-accommodated portions are plastically deformed in the axially outward direction, to shape the tapered cage coil into a completed form of the tapered cage coil.

Specifically, the manufacturing method of the present invention has a feature that, in thrusting the slot-accommodated portions into the slots that are open, the tapered cage coil, before being thrust into the stator core, has the top coil end having a diameter shorter than that of the inner peripheral surface of the stator core, and a base coil end having a diameter larger than that of the inner peripheral surface of the stator core. Thus, before the radial-expansion thrusting operation, the slot-accommodated portions of the tapered cage coil (i.e. the conductor portions of the stator coil, which are accommodated in the slots) are inclined with respect to the axial direction of the stator core. Also, owing to the radial-expansion thrusting operation, the length of the axial projection of the top coil end is reduced. Accordingly, an opening angle will be increased in each of the coil end portions configuring the top coil end.

According to the present invention, the radial-expansion thrusting operation only has to be carried out for one of the two coil ends of the stator, unlike the conventional thrusting method in which the radial-expansion thrusting operation has been carried out for both of the coil ends of the stator coil. Thus, the radial-expansion thrusting operation can be facilitated. Also, the reaction force of the stator coil in the radial expansion thrusting may be reduced to half. Accordingly, the stress imparted to the insulation coating of the stator coil may also be reduced to half. Thus, the spring back force of the stator coil, which would be caused after the radial-expansion thrusting operation, may also be reduced to half. In this manner, the present invention can realize the method for manufacturing a stator for an inner-rotor type rotary electric machine of high quality, which method can facilitate the manufacturing processes, compared with the conventional methods.

An analogous method may be conceived, which includes a step of preparing in advance a cage coil having a diameter which corresponds to a diameter that can be derived from the state where slot-accommodated portions have already been inserted, a step of reducing the diameter of the cage coil for forcible insertion into a stator core, and a step of radially biasing the slot-accommodated portions of the cage coil, for insertion into slots. However, this method has a problem of difficulty in reducing the diameter of the cage coil and in maintaining the reduced state before the coil is set at a predetermined position of the stator core. This problem can be significantly mitigated by the present invention in which the stator coil is prepared with one of the coil ends being ensured to be brought into the state of being radially reduced.

In a preferred mode of the present invention, the method for manufacturing a stator for an inner-rotor type rotary electric machine according to claim 1, further comprises: preparing a circumferentially expanded wave-winding coil by bending a linear conductor wire into a wave pattern in which a base coil end portion configuring the base coil end, the slot-accommodated portion corresponding to a forward slot-accommodated portion, a top coil end portion configuring the top coil end, and the slot-accommodated portion corresponding to a return slot-accommodated portion are sequentially connected; preparing a circumferentially expanded stator coil by combining the circumferentially expanded wave-winding coils equivalent to the number of phases; and preparing the tapered cage coil by curling up the circumferentially expanded stator coil into a cylindrical shape.

Thus, the tapered cage coil can be readily prepared to simplify the manufacturing processes.

In a preferred mode of the present invention, the tapered cage coil is made up of an insulation-coated flat conductor wire.

Thus, a high-current rotary electric machine with reduced size and weight can be realized.

In a preferred mode of the present invention, the top coil end of the tapered cage coil is projected in the axial direction more than the base coil end of the tapered cage coil.

Thus, in performing the radial-expansion thrusting operation, a radial expansion process for the base coil end can be eliminated. As a result, the radial-expansion thrusting operation can be facilitated, and in addition, spring back of the stator coil that would occur after the radial-expansion thrusting operation can be mitigated.

In a preferred mode of the present invention, each of the top coil end portions of the circumferentially expanded wave-winding coil is formed to have a circumferential expansion width smaller than that of each of the base coil end portions of the circumferentially expanded wave-winding coil; each of the top coil end portions of the circumferentially expanded wave-winding coil is formed to have an axial projection length larger than that of each of the base coil end portions of the circumferentially expanded wave-winding coil; and the slot-accommodated portions of the circumferentially expanded stator coil are extended at a certain inclination with respect to a direction in which the circumferentially extended stator coil is extended, the direction corresponding to a direction perpendicular to the axial direction.

It is preferable that, concurrently with the axial insertion of the tapered cage coil into the stator core, for location axially inside the stator core, the slot-accommodated portions of the tapered cage coil may be thrust into the slots. Thus, the radial-expansion thrusting operation can be facilitated.

In a preferred mode of the present invention, the circumferentially expanded wave-winding coil is wrapped about a tapered jig, the jig having grooves axially extended, being communicable with openings of the slots of the stator core, and guide plates axially outwardly extended, being positioned on circumferentially lateral sides of each of the grooves, so that the slot-accommodated portions can be inserted into the grooves to prepare the tapered cage coil.

Thus, the tapered cage coil can be readily prepared.

In a preferred mode of the present invention, the slot-accommodated portions of the tapered cage coil are linearly provided from the top coil end to the base coil end at a certain inclination.

Thus, the radial-expansion thrusting operation can be facilitated.

In a preferred mode of the present invention, of the slot-accommodated portions of the tapered cage coil, a portion near the top coil end has a relatively larger inclination with respect to the axial direction, compared with a portion near the base coil end.

Thus, spring back can be mitigated.

DETAILED DESCRIPTION OF THE PREFERRED EMBODIMENTS

With reference to FIG. 1 to FIGS. 9A and 9B, hereinafter will be specifically described a preferred embodiment of the present invention.

The preferred embodiment deals with a structure of a stator for a rotary electric machine, which stator is configured by mounting a cage stator coil of distributed winding on a core, and a method for manufacturing the stator. It should be appreciated that the present embodiment is just intended to exemplify a preferred mode of the present invention and that, as a matter of course, the technical concept of the present invention may be implemented, being combined with other known techniques.

Figure 1:
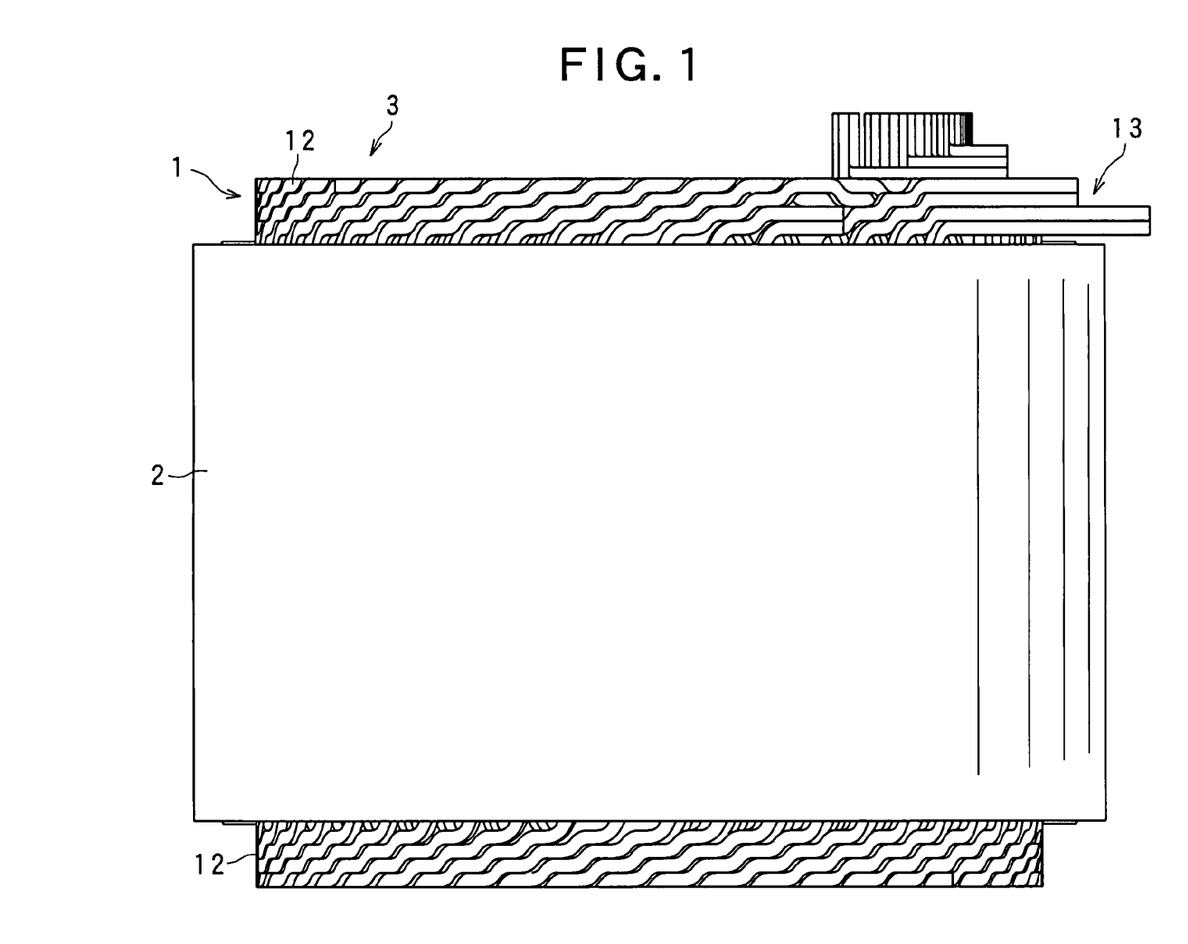
FIG. 1 is a side view of a stator to be loaded on a rotary electric machine, according to an embodiment of the present invention.
Figure 2:
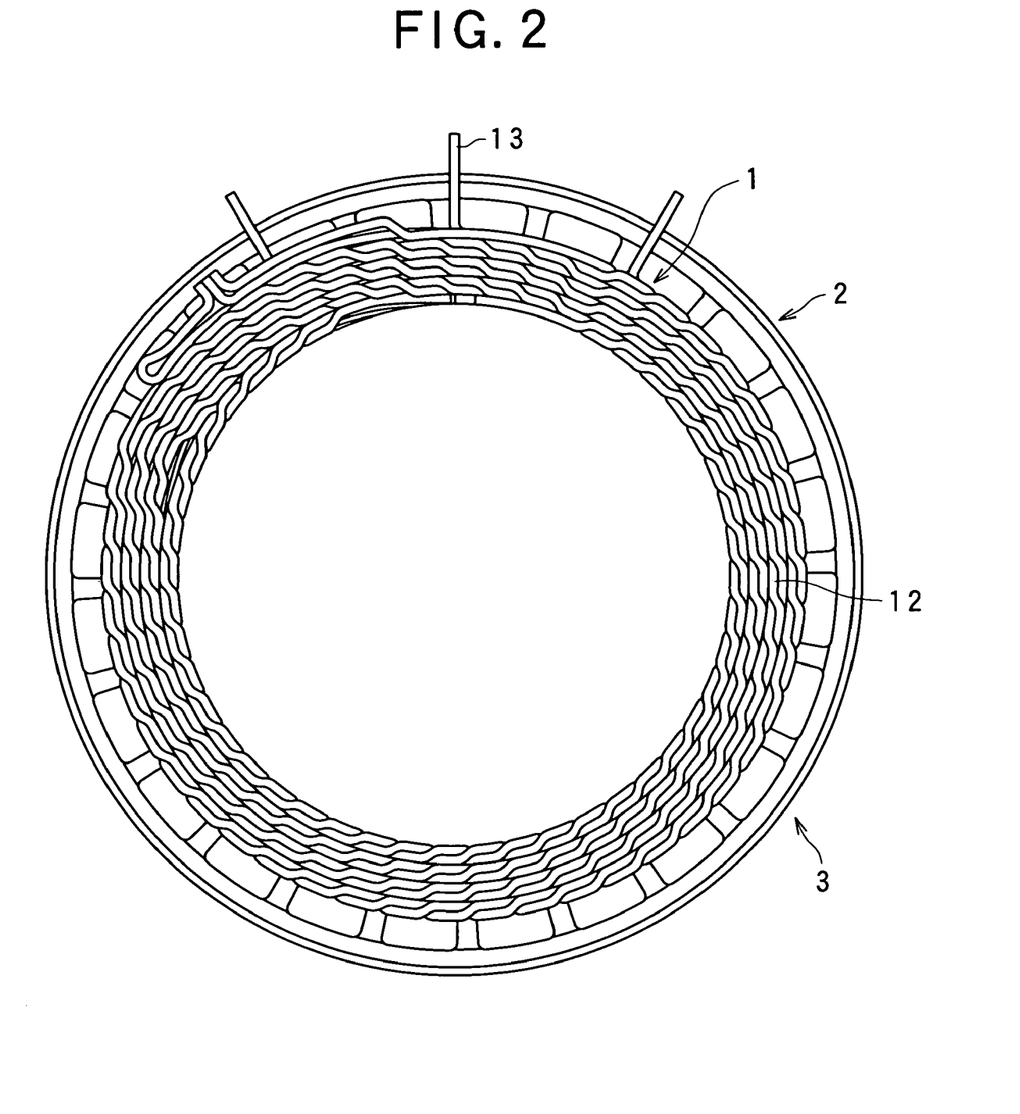
FIG. 2 is a plan view illustrating the stator illustrated in FIG. 1.

Referring to FIGS. 1 and 2, the stator of the present embodiment is described.

FIG. 1 schematically shows an appearance of a rotary electric machine RM according to the present embodiment. The rotary electric machine RM includes a stator coil 1 and a stator core 2. The stator coil 1 is mounted on the stator core 2 to configure a radially-gapped inner-rotor type rotary electric machine 3. The stator coil 1 is configured by star-connecting three-phase windings, each of which is obtained by winding in a distributed manner a large-size flat conductor wire having a large cross-sectional area. Thus, the stator coil 1, as a whole, has the shape of a cage.

Figure 3:
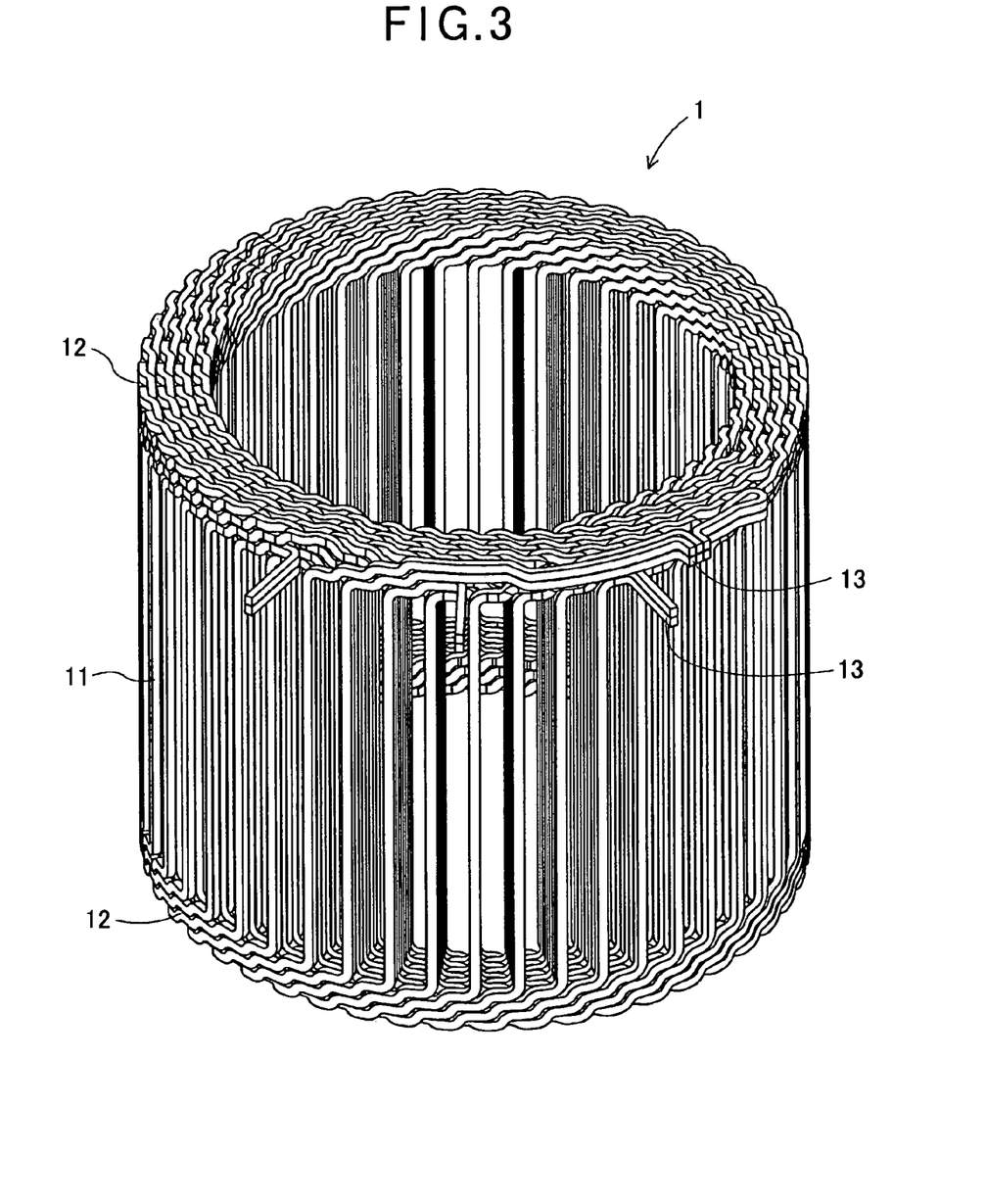
FIG. 3 is a perspective view illustrating the stator coil illustrated in FIG. 1.

The stator coil 1 is explained with reference to FIG. 3. FIG. 3 is a perspective view illustrating the stator coil 1.

The stator coil 1 includes a number of slot-accommodated portions 11 which are conductive parts to be inserted into respective slots of the stator core 2. The stator coil 1 also includes coil end portions 12 which are conductive parts projected axially outward from both ends of the respective slot-accommodated portions, or in other words, projected from both end faces of the stator core 2. Each of the coil end portions 12 is formed by bending a conductor wire (a large-size flat conductor wire) into a shape of a staircase to provide steps in the substantially axial and circumferential directions. With this bending, the length of the axial projection of the coil end portions 12 is reduced. In the figure, a reference numeral 13 indicates output terminals and neutral points.

The cage stator coil 1 consists of the slot-accommodated portions 11 that axially pass through the slots of the stator core 2, and coil ends each of which corresponds to a group of the coil end portions 12. In each of the coil ends, each coil end portion 12 connects two slot-accommodated portions 11, 11 distanced from each other by an electrical angle of "$\pi$". In the present embodiment, the cage stator coil 1 is configured, being imparted with wave winding.

The wave-winding structure, per se, of the stator coil 1 will be briefly explained, although it is well known today. Each slot accommodates a total of eight slot-accommodated portions 11, concurrently forming eight overlaps in the radial direction and one step in the circumferential direction. As a matter of course, the stator coil 1 may be formed by lap winding. A group of two radial overlaps of the slot-accommodated portions 11 configure one turn of a three-phase wave-winding partial coil. Accordingly, the stator coil 1 is configured by serially connecting a total of four turns of three-phase wave-winding partial coils. Two slots are arranged for every pole and every phase. In other words, the stator core 2 has twelve slots per electrical angle of $2\pi$. The stator coil 1 is configured by a squared insulation-coated flat conductor wire having a substantially rectangular cross section.

Referring to FIGS. 1 and 2, hereinafter is explained the stator core 2 about which the stator coil 1 is wound.

The stator core 2 is formed into a cylindrical shape by stacking electromagnetic steel plates. Slots are circumferentially formed in the inner peripheral surface of the stator core 2 at a predetermined pitch. Each slot is a recess radially provided starting from a slot opening at the inner peripheral surface of the stator core 2. Each slot extends in the axial direction and may be slightly skewed to reduce torque ripple.

Figure 4:
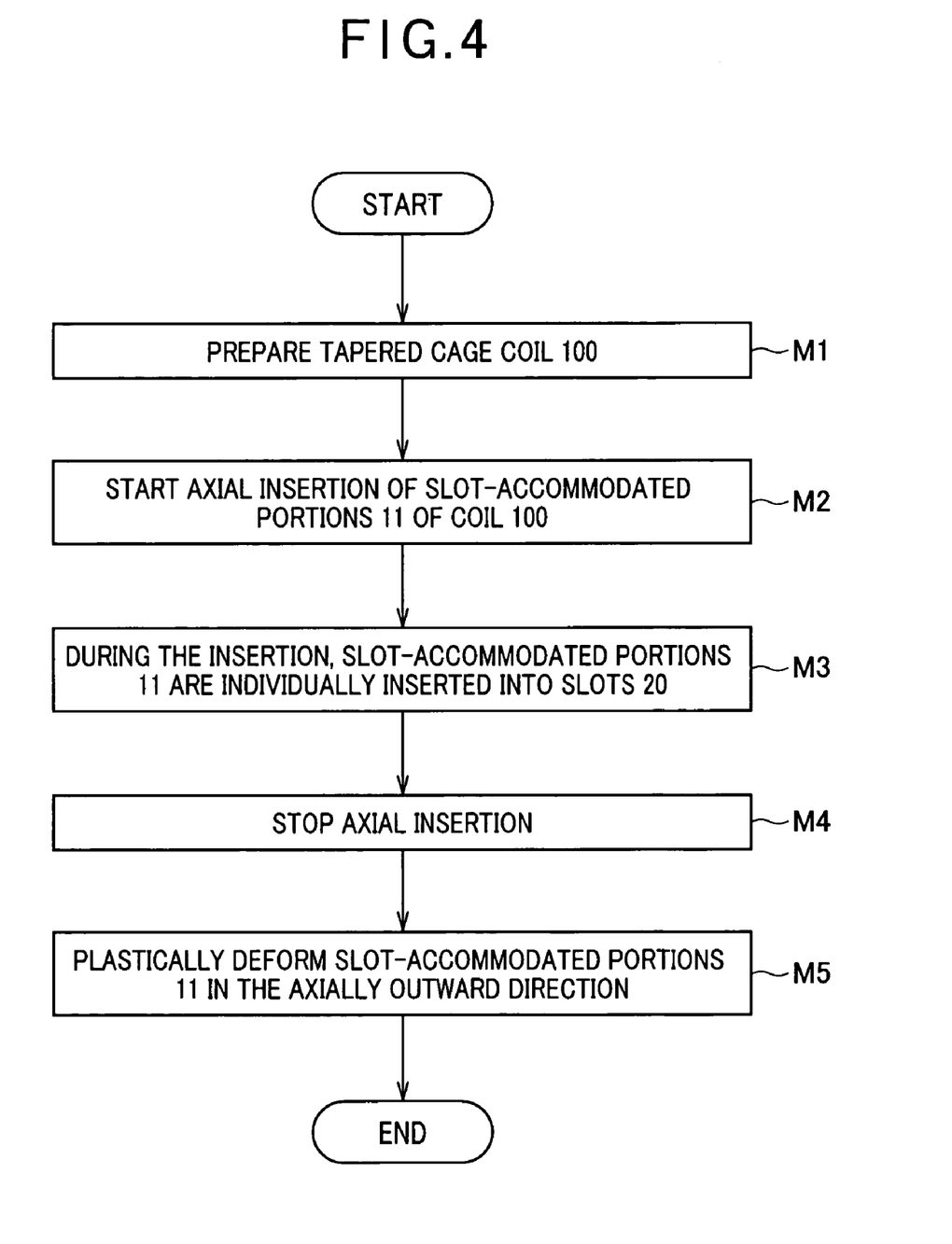
FIG. 4 is a flow diagram illustrating a method for manufacturing a stator related to the present invention.

Referring to a flow diagram shown in FIG. 4, a method of manufacturing the stator 3 is explained.

Figure 5:
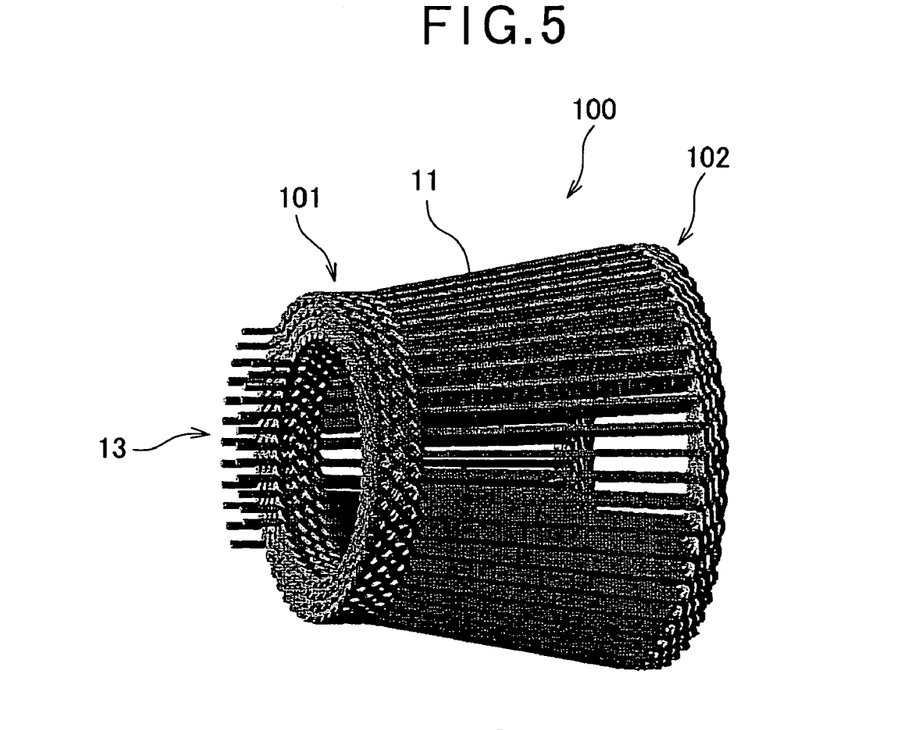
FIG. 5 is a schematic perspective view illustrating a tapered cage coil.

First, a tapered cage coil 100, as shown in FIG. 5, is prepared (step M1). The tapered cage coil 100 includes a top coil end 101 having a diameter smaller than that of the inner peripheral surface of the stator core 2, a base coil end 102 having a diameter larger than that of the inner peripheral surface of the stator core 2, and a predetermined number of slot-accommodated portions 11. Each of the slot-accommodated portions 11 is obliquely provided so as to be distanced from the axis as it extends from the top coil end 101 to the base coil end 102. The slot-accommodated portions 11 are axially extended at the same circumferential pitch as the slots. As shown in FIG. 5 and as mentioned above, each slot-accommodated portion 11 is provided so as to be inclined radially outward as it extends from the top coil end 101 to the base coil end 102.

Figure 6:
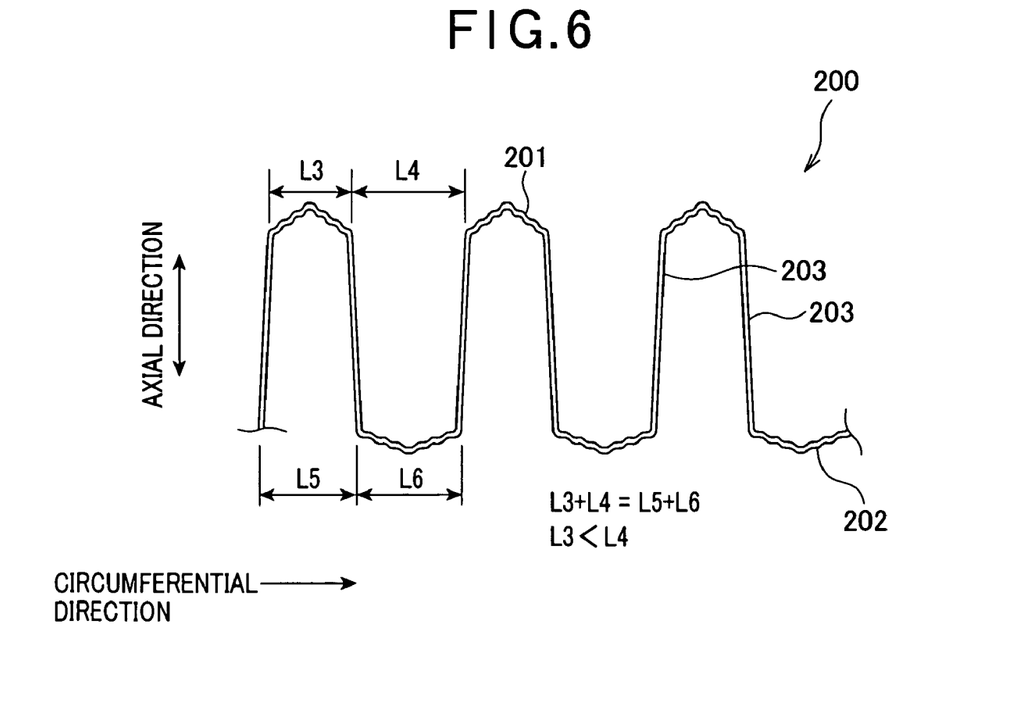
FIG. 6 is a circumferentially developed view illustrating a portion of a wave-winding coil corresponding to one phase.

Referring to FIG. 6, how to prepare the tapered cage coil 100 is explained.

First, a linear insulation-coated flat conductor wire is bent into a wave pattern, or bent into a serpentine shape, to provide a circumferentially expanded wave-winding coil 200. The circumferentially expanded wave-winding coil 200 consists of top coil end portions 201 for configuring the top coil end 101, base coil end portions 202 for configuring the base coil end 102, and slot-accommodated portions 203 which are substantially axially extended to establish connection between the coil end portions 201, 202.

Figure 7:
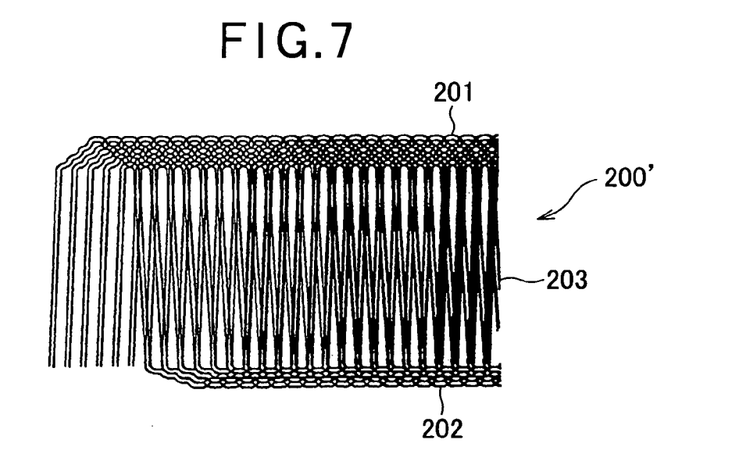
FIG. 7 is a circumferentially developed view of a three-phase wave-winding coil.

A circumferential expansion width L3 of each top coil end portion 201 is ensured to be smaller than a circumferential expansion width L6 of each base coil end portion 202. Also, the axial projection of each top coil end portion 201 is ensured to be larger than that of each base coil end portion 202. In FIG. 6, L3+L4=L5+L6 corresponds to the pitch of one slot. Since the circumferential expansion width L3 is smaller than an interval L4, each of the slot-accommodated portions 203 in a circumferentially expanded state is permitted to extend, being oblique with respect to the axial direction. The circumferentially expanded wave-winding coils 200 corresponding to three phases are woven to complete a three-phase circumferentially expanded wave-winding coil 200'. FIG. 7 shows such a three-phase circumferentially expanded wave-winding coil 200' (also referred to as "three-phase coil 200'").

Subsequently, the three-phase coil 200' is curled by bending to prepare the tapered cage coil 100 shown in FIG. 5. In this way, the slot-accommodated portions 203 of the three-phase coil 200' turn to the slot-accommodated portions 11 of the tapered cage coil 100. In the present embodiment, a tapered cylindrical jig 300 as shown in FIGS. 8A and 8B is used to impart a circumferentially constant pitch to the slot-accommodated portions 11 of the tapered cage coil 100 and to realize a conical shape.

Figure 8A:
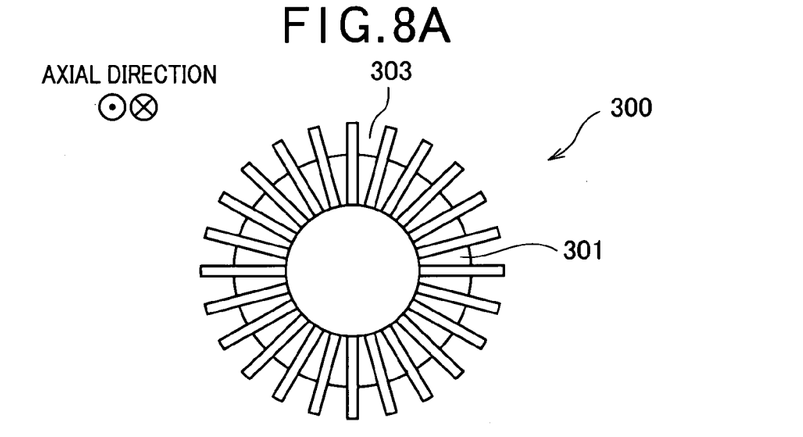
FIGS. 8A and 8B are elevational view and axial cross-sectional view, respectively, illustrating a tapered cylindrical jig for fabricating a tapered cage coil.
Figure 8B:
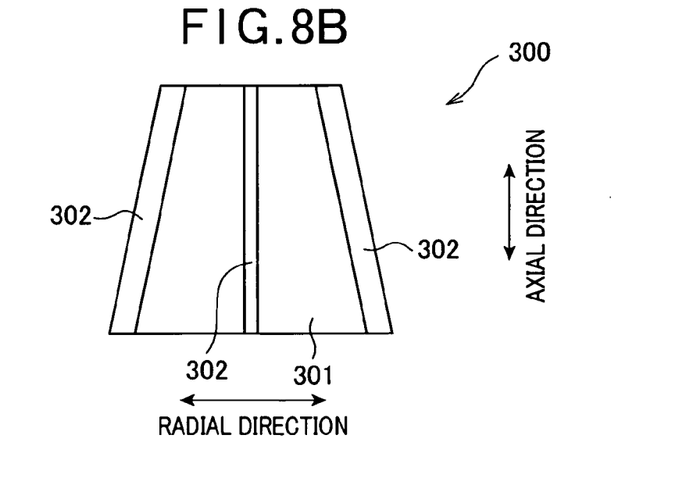

FIGS. 8A and 8B illustrate an elevational view and an axial cross-sectional view of the tapered cylindrical jig 300, respectively. The jig 300 includes a frusto-conical cylindrical portion 301, and guide plates 302 which are radially projected out of the tapered outer peripheral surface of the cylindrical portion 301, along the circumferential direction at a predetermined angular pitch.

However, for the sake of clarity, the guide plates illustrated in FIG. 8B are thinned to be provided at every 90 degrees. The jig 300 also includes grooves 303, each being provided between circumferentially adjacent two guide plates 302, 302. One group of the slot-accommodated portions 203 of the coil 200' corresponding to three phases is disposed in each of the grooves 303. In this regard, the three-phase coil 200' has a belt-like shape, while the grooves 303 are provided along the surface of the frusto-conical cylindrical portion 301. Therefore, the slot-accommodated portions 203 are inserted into the grooves 303, with the top coil end portions 201 of the coil 200' being biased so as to be compressed in the circumferential direction. In this way, the tapered cage coil 100 shown in FIG. 5 is finally completed.

Figure 9A:
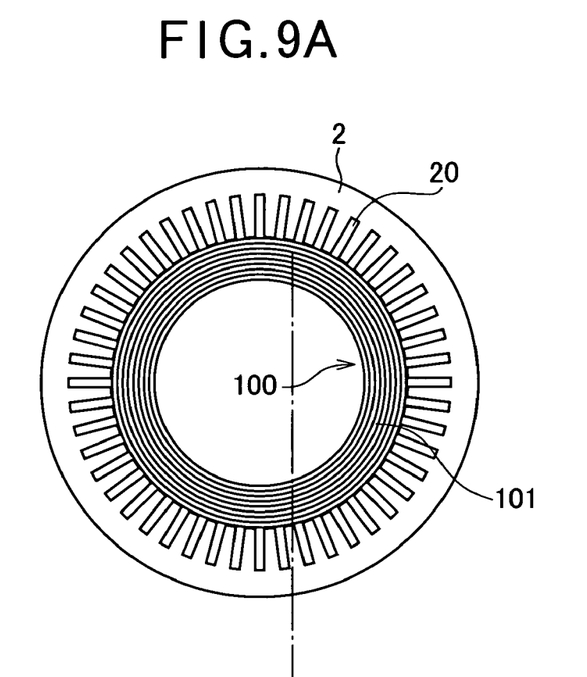
FIGS. 9A and 9B are elevational view and axial cross-sectional view, respectively, illustrating a state where the tapered cage coil has been inserted into a stator core.
Figure 9B:
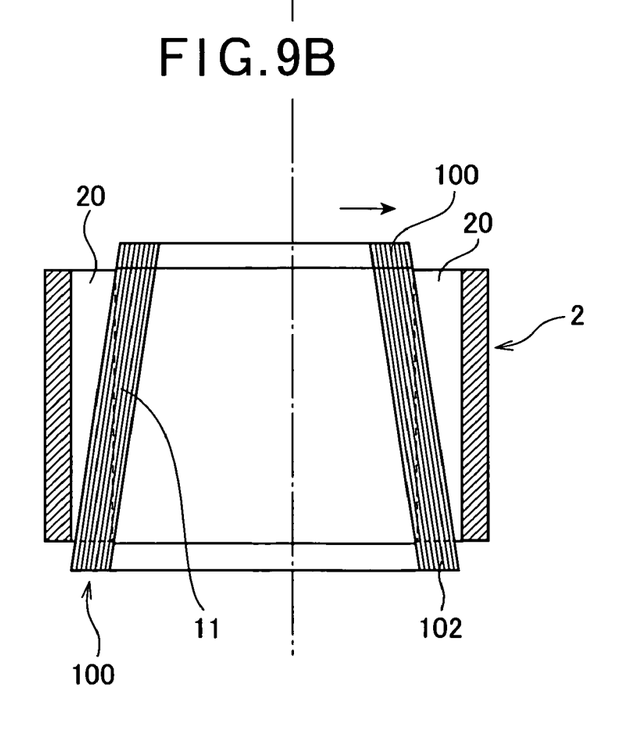

Referring now to FIGS. 9A and 9B, hereinafter is explained a step of inserting the slot-accommodated portions 11 of the tapered cage coil 100 into the slots of the stator core 2 (step M2).

First, the tapered cage coil 100 is positioned so as to be coaxial with the stator core 2. Specifically, the top coil end 101 of the tapered cage coil 100 is brought to a position near the end face on the base side of the stator core 2. In this case, the slot-accommodated portions 11 of the tapered cage coil 100 are ensured to be positioned radially inside the slots 20, so that the slot-accommodated portions 11 (the top coil end 101) may be circumferentially in alignment with the slots 20. Then, the tapered cage coil 100 is axially inserted into the stator core 2, with the top coil end 101 being inserted first. During the course of the insertion, the individual slot-accommodated portions 11 inserted from the openings of the respective slots 20 are gradually and partially accommodated in the slots 20. FIGS. 9A and 9B shows a state where the insertion has been completed (step M3).

In the axial insertion of the tapered cage coil 100, a tapered cage coil having substantially the same shape as the jig 300 shown in FIGS. 8A and 8B may be used. However, the guide plates of such a tapered cylindrical jig should have a diameter slightly smaller than the diameter of the inner peripheral surface of the stator core 2, so that the jig can be inserted into the stator core 2. Using the tapered cylindrical jig, the tapered cage coil 100 fitted to the jig can be easily inserted into the stator core 2 along the axial direction. In this case, the jig should be kept so that the guide plates may be circumferentially in alignment with the teeth of the stator core 2, which teeth are defined by the slots 20 of the stator core 2.

Figure 10A:
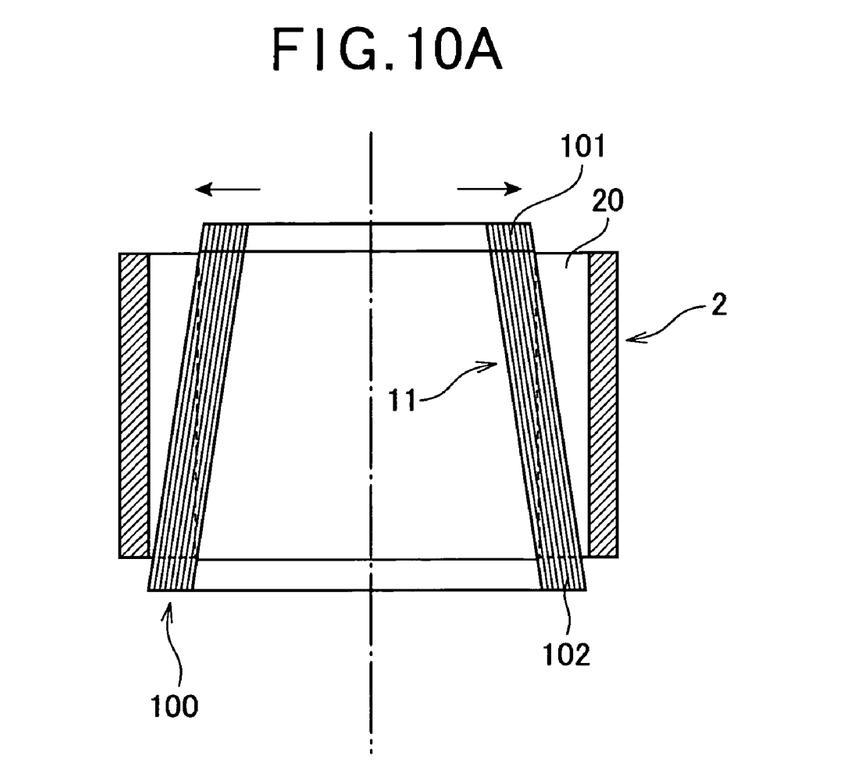
FIG. 10A is an axial cross-sectional view illustrating an operation for radial expansion of the tapered cage coil.
Figure 10B:
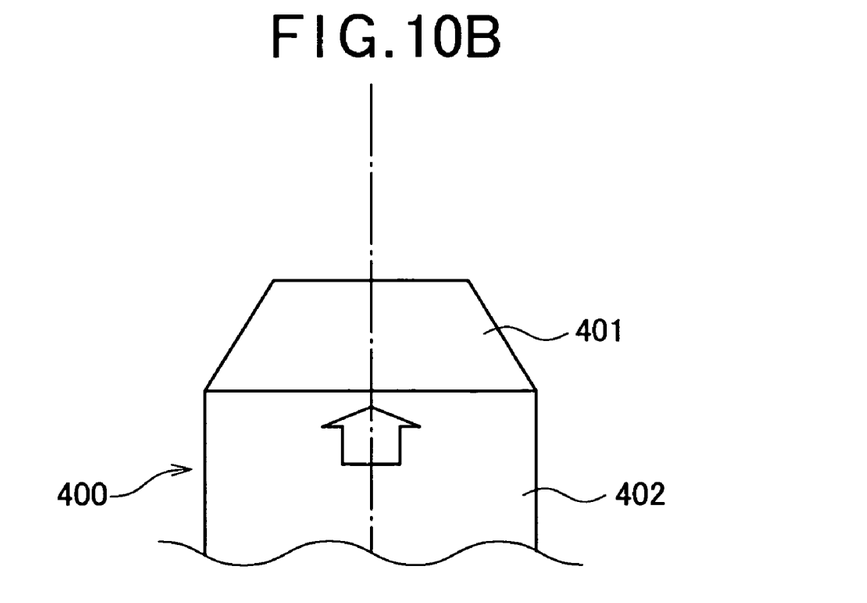
FIG. 10B is a partial elevational view of a diameter-expanding drum used for the radial expansion.

Referring no to FIGS. 10A and 10B, hereinafter is explained a step of thrusting the slot-accommodated portions 11 of the tapered cage coil 100 into the slots of the stator core 2, for radial expansion.

A radial-expansion drum 400 is a columnar member having a frusto-conical end portion. Specifically, the radial-expansion drum 400 includes a cylindrical base portion 402 and a frusto-conically tapered portion 401 provided on top of the cylindrical base portion 402. The radial-expansion drum 400 is positioned so as to be coaxial with the stator core 2, for axial advance and retreat by an actuator, not shown. The radial-expansion drum 400 is ensured to be formed so that the maximum diameter thereof will be slightly smaller than the inner diameter of the stator core.

The radial-expansion drum 400 is thrust into the tapered cage coil 100 in the stator core 2 from the side of the base coil end 102 of the tapered cage coil 100. Thus, the slot-accommodated portions 11 are radially biased by the outer peripheral surface of the cylindrical base portion 402 of the drum 400, whereby the slot-accommodated portions 11 are individually thrust into the slots 20 (step M3). In the course of the thrusting, a stopper, not shown, will inhibit the axial movement of the top coil end 101. In order to assist the thrusting operation for radial expansion (hereinafter referred to as "radial-expansion thrusting operation"), the top coil end 101 may be biased in the direction of expanding the diameter. At the stage where the cylindrical base portion 402 of the drum 400 has radially expanded the top coil end 101, the thrusting step for radial expansion is completed (step M5).

After completing radial expansion using the radial-expansion drum 400, the slot-accommodated portions 11 are further biased in the radial direction, for thrusting them into the slots 20. In performing this thrusting, a cylindrical jig may be used, for example, which is provided with axially movable thrust plates at the outer peripheral surface thereof. In this case, the thrust plates are ensured to axially extend at positions that can be circumferentially in alignment with the slots 20. The thrust plates may be radially biased by thrusting a radial-expansion drum similar to the radial-expansion drum 400 shown in FIG. 10B, into the cylindrical jig.

According to the embodiment described above, substantially only one of the two coil ends has to be radially expanded. Accordingly, the radial-expansion thrusting operation can be facilitated, while spring back that may be caused thereafter can be mitigated.

(Modifications)

Hereinafter will be described some modifications of the above embodiment. In the following modifications, the identical or similar components to those in the above embodiment described above are given the same reference numerals for the sake of omitting explanation.

(First Modification)

In the above embodiment, the tapered cylindrical jig 300 (see FIGS. 8A and 8B) has been used to curt up the circumferentially expanded wave-winding coil 200 to prepare the tapered cage coil 100. In this case, the guide plates 302 may be removed from the jig 300 to serve as the radial-expansion drum 400 for thrusting the slot-accommodated portions into the slots of the stator core 2.

(Second Modification)

Figure 11A:
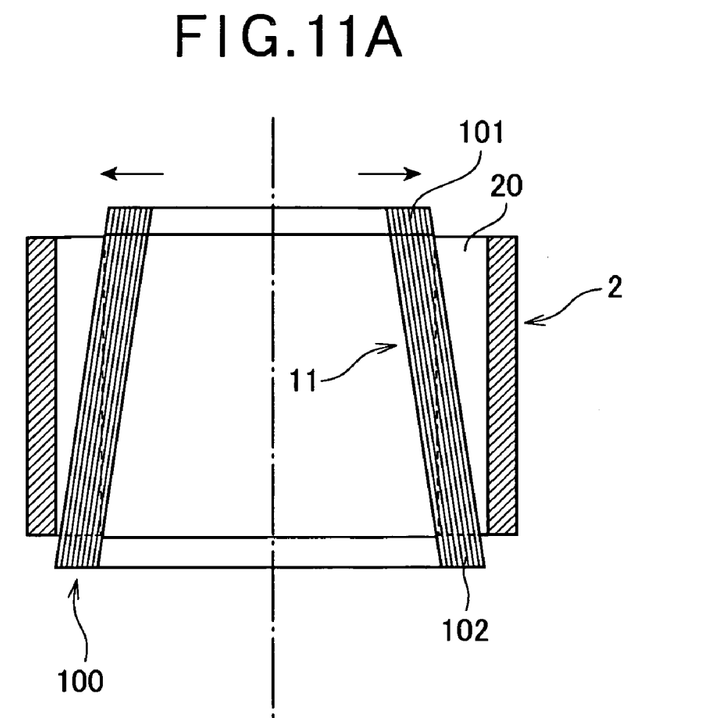
FIG. 11A is an axial cross-sectional view illustrating an operation for radial expansion of a tapered cage coil, according to a modification of the present embodiment.
Figure 11B:
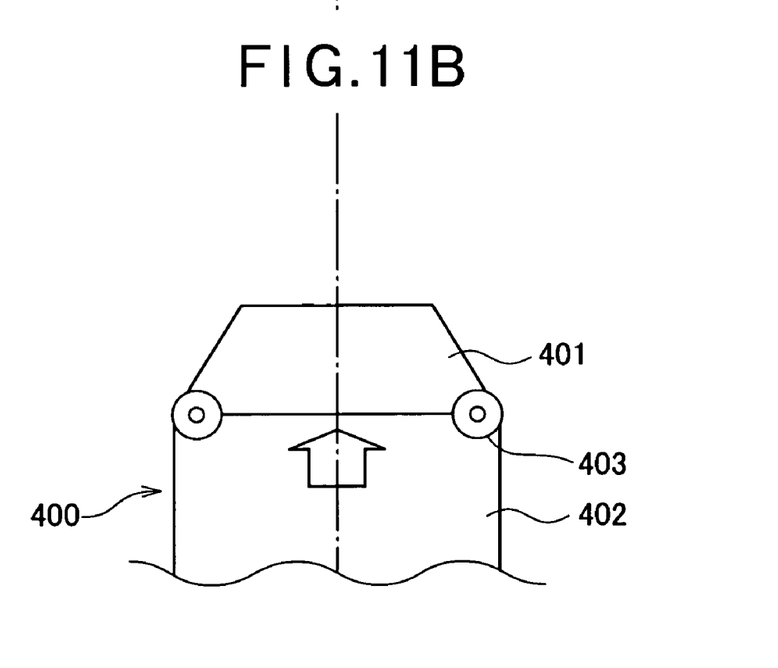
FIG. 11B is a partial elevational view of a diameter-expanding drum used for the radial expansion.

Referring to FIGS. 11A and 11B, a second modification is explained.

FIGS. 11A and 11B show a modification of the radial-expansion rum 400. The radial-expansion drum 400 is characteristic in that guide rollers 403 are provided at the boundary between the frusto-conically tapered portion 401 and the cylindrical base portion 402. The number of the guide rollers 403 is the same as that of the slots (=the number of the slot-accommodated portions 11). The axis of each guide roller 403 is ensured to extend in the direction of the tangent line of the cylindrical base portion 402. Measuring from the axis of the drum 400, the outer peripheral surface of each guide roller 403 is ensured to radially coincide with the outer peripheral surface of the base portion 402, but may be radially outwardly projected from the outer peripheral surface of the base portion 402. In the case of the latter, each guide roller 403 partially enters into each slot 20 from the opening of the slot 20. In this way, the radial expansion operation can be smoothly conducted and the stress imposed on the insulation coating can be mitigated.

(Third Modification)

A third modification of the radial-expansion drum 400 is explained below. The drum 400 may be provided with a number of thrust plates at its outer peripheral surface at the circumferential pitch of the slots. The thrust plates are axially extended, being disposed at positions that can be circumferentially in alignment with the slots 20. Each thrust plate has a radially outer end face which is ensured to be located at a position enabling insertion into each slot 20. With this configuration, the thrust plates are thrust into the respective slots 20 upon thrusting of the drum 400 in the axial direction. As a result, the slot-accommodated portions 11 can be thrust deep into the slots 20. Preferably, the thrust plates may be disposed on the base side of the cylindrical base portion 402.

(Fourth Modification)

Figure 12A:
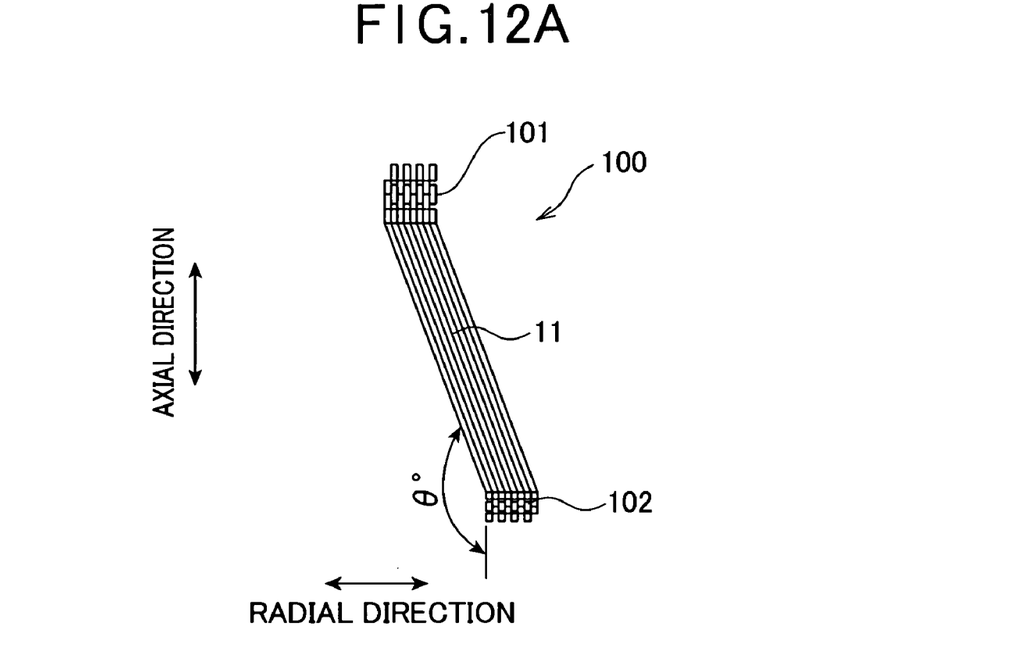
FIG. 12A is a partial cross-sectional view illustrating linear slot-accommodated portions of a tapered cage coil.
Figure 12B:
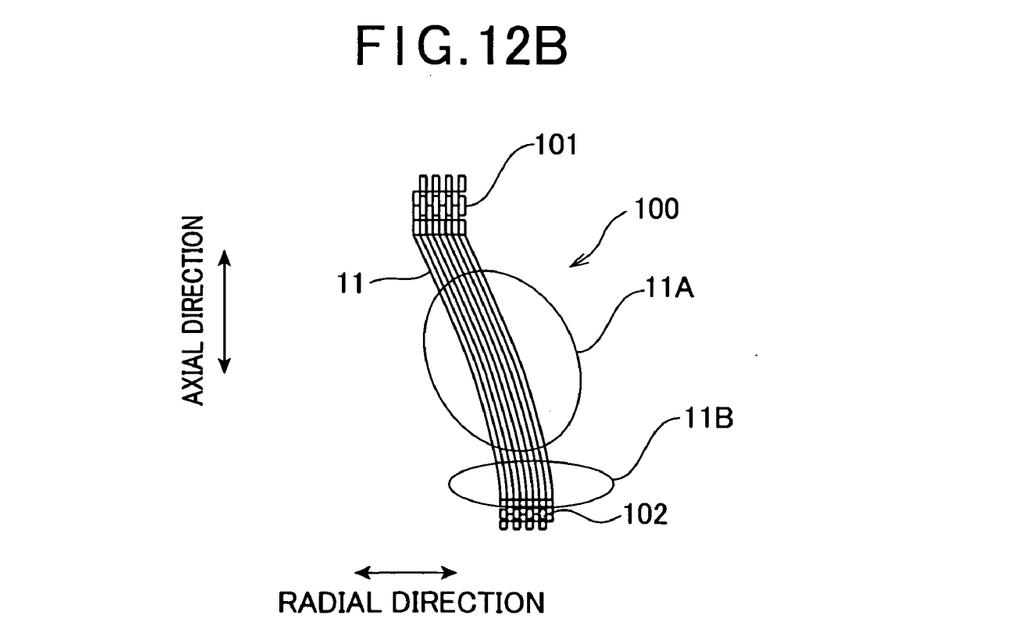
FIG. 12B is a partial cross-sectional view illustrating radially outwardly curved slot-accommodated portions of a tapered cage coil.

Referring to FIGS. 12A and 12B, a fourth modification is explained. FIGS. 12A and 12B are partial cross-sectional views each illustrating slot-accommodated portions of the tapered cage coil 100 shown in FIG. 4. The partial slot-accommodated portions in each of the figures correspond to the slot-accommodated portions 11 for one slot.

FIG. 12A shows a total of eight slot-accommodated portions 11 for one slot, which are inclined at an angle "θ" from the top coil end 101 to the base coil end 102.

FIG. 12B also shows a total of eight slot-accommodated portions 11 for one slot, which are axially outwardly curved. In other words, the angle "θ" of the slot-accommodated portions 11 shown in FIG. 12B is made larger than the angle "θ" of the conductor portions 11 shown in FIG. 12A. Specifically, of the slot-accommodated portions 11 shown in FIG. 12B, the portions in the vicinity of the top coil end 101 are substantially axially extended, and the remaining portions are radially outwardly curved as can be seen in FIG. 12B.

With this configuration, when the slot-accommodated portions 11 of the tapered cage coil 100 are thrust into the slots, for radial expansion, deformation of the slot-accommodated portions 11 can be mitigated. As a result, spring back that would be caused thereafter will be mitigated.

What is claimed is:

1. A method of manufacturing a stator for an inner-rotor type rotary electric machine, the stator including a stator core having an inner peripheral surface in which a plurality of slots are formed, and a cage stator coil having slot-accommodated conductor portions to be accommodated in the respective slots and a top coil end portion and a base coil end portion, each of the top coil end portion and the base coil end portion being formed by grouping coil end conductor portions each connecting end portions of the slot-accommodated conductor portions, the method comprises the steps of:

preparing a tapered cage coil that includes the top coil end portion having a diameter smaller than that of the inner peripheral surface of the stator core, the base coil end portion having a diameter larger than the inner peripheral surface of the stator core, and the slot-accommodated conductor portions obliquely extended from the top coil end portion toward the base coil end portion in a direction of increasing distance from an axis of the tapered cage coil;

inserting the tapered cage coil headfirst into the stator core along an axial direction with the top coil end portion as being a head; and shaping the stator coil as a complete form by having the top coil end portion projected from an end face of the stator core, followed by deforming the slot-accommodated conductor portions radially outward, and pushing the slot-accommodated conductor portions into the respective slots.

2. The method of manufacturing a stator for an inner-rotor type rotary electric machine according to claim 1, wherein the tapered cage coil is prepared through steps of:

preparing a circumferentially-expanded wave-winding coil that is shaped by bending a linear conductor wire into a waveform, the circumferentially-expanded wave-winding coil sequentially providing base-coil-end conductor portions for configuring the base coil end portion, the slot-accommodated conductor portions in a forward direction, top-coil-end conductor portions for configuring the top coil end portion and the slot-accommodated conductor portions in a backward direction;

preparing a circumferentially-expanded stator coil by combining the circumferentially-expanded wave-winding coils by a number corresponding to the number of phases; and curling up the circumferentially-expanded stator coil into a cylindrical shape.

3. The method of manufacturing a stator for an inner-rotor type rotary electric machine according to claim 1, wherein the tapered cage coil is configured by an insulation-coated flat conductor wire.

4. The method of manufacturing a stator for an inner-rotor type rotary electric machine according to claim 1, wherein the top coil end portion of the tapered cage coil is projected in the axial direction to an extent larger than the base coil end portion of the tapered cage coil.

5. The method of manufacturing a stator for an inner-rotor type rotary electric machine according to claim 2, wherein:
- the top-coil-end conductor portions of the circumferentially-expanded wave-winding coil have a circumferential width of expansion smaller than that of the base-coil-end conductor portions of the circumferentially-expanded wave-winding coil;
- the top-coil-end conductor portions of the circumferentially-expanded wave-winding coil has an axial length of projection larger than that of the base-coil-end conductor portions of the circumferentially-expanded wave-winding coil; and
- the slot-accommodated conductor portions of the circumferentially-expanded stator coil are extended in an oblique direction with respect to a direction of extension of the circumferentially-expanded stator coil, the direction of extension being perpendicular to the axial direction.

6. The method of manufacturing a stator for an inner-rotor type rotary electric machine according to claim 5, wherein the tapered cage coil is prepared by winding up the circumferentially-expanded wave-winding coil about a tapered jig, the tapered jig having an outer peripheral portion which is provided with grooves extended in the axial direction to enable communication with openings of the respective slots of the stator core and guide walls located circumferentially lateral sides of each of the grooves and extended radially outward, and by accommodating the slot-accommodated conductor portions in the respective grooves.

7. The method of manufacturing a stator for an inner-rotor type rotary electric machine according to claim 1, wherein the slot-accommodated conductor portions of the tapered cage coil are linearly and obliquely extended from the top coil end portion toward the base coil end portion.

8. The method of manufacturing a stator for an inner-rotor type rotary electric machine according to claim 1, wherein, of the slot-accommodated conductor portions of the tapered cage coil, portions near the top coil end portion have an oblique angle with respect to the axial direction, the oblique angle being relatively larger than that of portions near the base coil end portion.

* * * * *